United States Patent [19]

James

[11] 4,192,287
[45] Mar. 11, 1980

[54] SOLAR WATER HEATERS

[76] Inventor: George S. James, 5-13th Ave., Parktown North, Johannesburg, Transvaal, South Africa

[21] Appl. No.: 858,067

[22] Filed: Dec. 6, 1977

[30] Foreign Application Priority Data

Dec. 15, 1976 [ZA] South Africa .................. 76/7471

[51] Int. Cl.² .............................................. F24J 3/02
[52] U.S. Cl. .................................................. 126/449
[58] Field of Search ............... 126/270, 271; 237/1 A

[56] References Cited

U.S. PATENT DOCUMENTS

| 3,986,491 | 10/1976 | O'Hanlon | 126/271 |
| 4,007,729 | 2/1977 | Chao et al. | 126/271 |
| 4,010,733 | 3/1977 | Moore | 126/271 |
| 4,011,856 | 3/1977 | Gallagher | 126/271 |
| 4,077,393 | 3/1978 | Mattson | 126/271 |

FOREIGN PATENT DOCUMENTS

| 253223 | 8/1960 | Australia | 126/271 |
| 2262206 | 9/1975 | France | 126/271 |

Primary Examiner—Samuel Scott
Assistant Examiner—Lee E. Barrett
Attorney, Agent, or Firm—Cushman, Darby & Cushman

[57] ABSTRACT

In a solar water heater a heat absorbing collector panel is made to inverted box rib or corrugated shape to match other roofing panels. Conduits are secured to the flanks of box ribs or the crests of corrugations. A translucent cover of complemental box rib or corrugated shape rests on the metal sheet in register with it on strips of insulating material all around the area of the heater.

5 Claims, 4 Drawing Figures

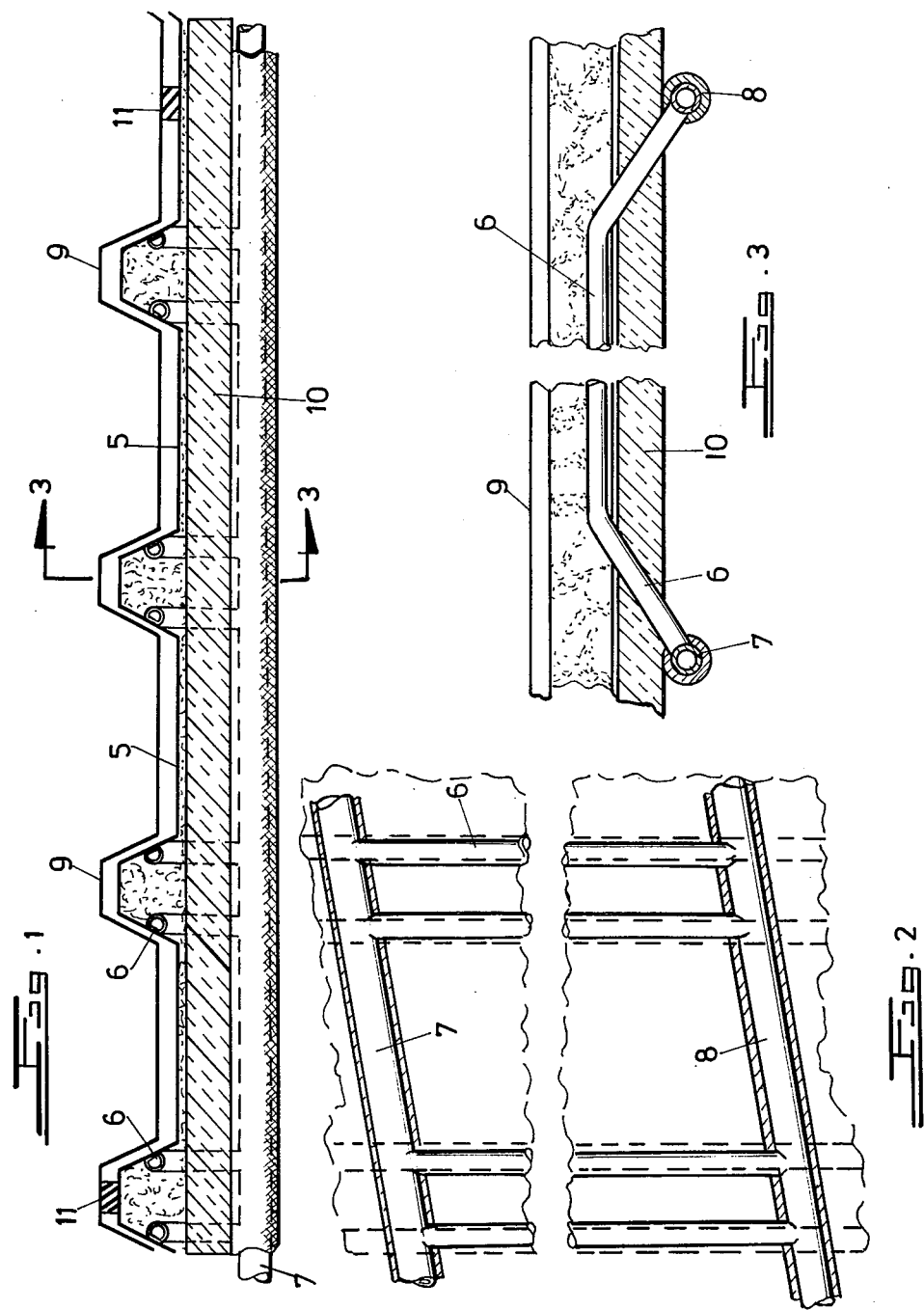

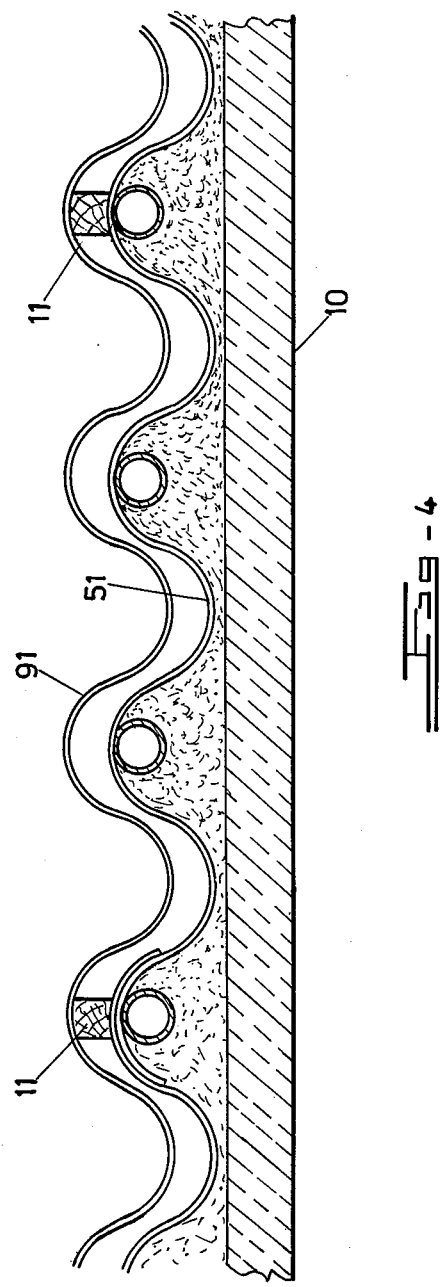

SOLAR WATER HEATERS

BACKGROUND OF THE INVENTION

This invention relates to solar water heaters.

A variety of solar water heaters have been proposed for use on the roofs of buildings for the purposes of providing a hot water supply. These conventional heaters all are aesthetically unsatisfactory on pitched roofs because they form an interruption of the normal roof surface so that some of them simply look ugly. Also the capital cost of most conventional water heaters in relation to the energy recoverable is reasonably high.

An object of the invention is to provide a solar water heater which is aesthetically more pleasing than conventional solar heaters on pitched roofs. Another object, in relation to the preferred embodiments of the invention is to provide a solar water heater the capital cost of which will be reduced in relation to solar heaters presently available on the market.

SUMMARY OF THE INVENTION

According to the invention a solar heat collecting panel of the kind comprising a collector plate, conduits, for conveying liquid, fixed to the collector plate, and a solar radiation transmitting cover spaced from the collector plate, is characterised in that the collector plate is made of metallic sheet formed to box rib or corrugated shape, the conduits, are fixed to the underside of upwardly projecting ribs or corrugations and the cover to the panel is shaped to be complemental to the collector plate.

Also according to the invention the cover and the collector plate of the panel are both shaped to conform to the shape and pattern of the roof covering of a building on which it is to be installed.

A collector panel of the preferred form of the invention could consist of a sheet of metal shaped as a roofing panel with conduits secured to the flanks or crests of corrugations or box ribs in heat conducting relationship as by soldering. The top of the panel is usually painted black with a suitable paint.

DESCRIPTION OF THE DRAWINGS

FIG. 1 is a section through a solar heating panel according to the invention,

FIG. 2 is a plan view of such a panel,

FIG. 3 is a section on the line 3—3 in FIG. 1, and

FIG. 4 is a view similar to FIG. 1 of another embodiment.

DESCRIPTION OF PREFERRED EMBODIMENTS

The solar heat collecting panel illustrated comprises a collector plate 5 of a conventional inverted box rib shape. The plate could be made of copper sheeting or of galvanized iron. The latter is cheaper and the former a better heat conductor. The top surface of the plate 5 is painted black.

Along the inside of the flanks of some of the box ribs there are soldered copper pipes 6 which run between two manifolds 7 and 8 (FIG. 2). The plate 5 rests on a board 10 of insulating material, e.g. a fibreglass board and the remainder of the spaces of the box ribs are suitably insulated as by being filled with fibre glass wool.

The plate 5 is covered by a translucent sheet of resin-bonded fibre glass 9 with the interposition of foam rubber strips 11 all around the area of the water heater. The spacing between the sheets 5 and 9 is about 10 mm. The so-called hot-house effect is created in the space between the sheets 5 and 9.

Looking at FIG. 2 it will be seen that the manifolds 7 and 8 run at a slight inclination to lines normal to the direction of the box ribs. This inclination avoids air bubbles which have been found to hinder thermosyphoning when the collecting panel is connected to an insulated header tank in the conventional manner.

FIG. 4 shows the invention applied to panels 51 made of corrugated roofing sheets of the standard sinusoidal type. In this case it is convenient to have the pipes 6 at the crests of corrugations in the sheets. The cover 91 is of a complemental shape to the sheet 51 as can be seen from the drawings. In all other respects this embodiment may be the same as the previous one.

There is a danger that during winter months damage may occur due to freezing of water in the system. This may be overcome by inserting into the manifolds flexible tubes, sealed at both ends to absorb the expansion due to the freezing of water. The tubes should not have an outside diameter greater than one third of the internal diameter of the manifold pipes so that the water flow is not restricted when heating is taking place.

I claim:

1. A solar heat collecting panel of the kind comprising a collector plate, conduits, for conveying liquid, fixed to the collector plate and a solar radiation transmitting cover spaced from the collector plate, characterised in that the collector plate is made of metallic sheet formed to box rib or corrugated shape, the conduits are fixed to the underside of upwardly projecting ribs or corrugations and the cover to the panel is continuous over the panel, is shaped to be complemental to the collector plate, and has its ribs or corrugations in register with those of the collector plate.

2. The collecting panel claimed in claim 1 in which the collector plate and the cover are shaped to conform to the shape and pattern of the roof covering of a building.

3. The solar heat collecting panel as claimed in claim 1 in which the top surface of the metal sheet is treated to absorb solar radiation.

4. A solar heat collecting panel comprising a sheet of metal formed as a roofing panel with inverted box ribs, conduits secured to the inside of the flanks of box ribs in heat conducting relationship, a solar radiation transmitting cover spaced from and continuous over the metal sheet and also formed to inverted box rib shape and so positioned that surfaces on the metal sheet are parallel to surfaces on the cover, insulating means sandwiched between the cover and the metal sheet around the area underlain by the conduits, and manifolds for feeding fluid to and leading fluid from the conduits.

5. A solar heat collecting panel comprising a sheet of metal formed as a roofing panel with sinusoidal corrugations, conduits secured to the underside of crests in the sheet in heat conducting relationship, a solar radiation transmitting cover also of sinusoidal shape spaced from and continuous over the metal sheet and so positioned that surfaces on the metal sheet are parallel to the surfaces on the cover, insulating means sandwiched between the cover and the metal sheet around the area underlain by the conduits, and manifolds for feeding fluid to and leading fluid from the conduits.

* * * * *